United States Patent [19]

Kawajiri et al.

[11] Patent Number: 4,711,091
[45] Date of Patent: Dec. 8, 1987

[54] APPARATUS FOR PREVENTING THE RISE OF OIL IN A STIRLING ENGINE

[75] Inventors: Kazuhiko Kawajiri; Michio Fujiwara; Kazunori Tsuchino; Youichi Hisamori, all of Amagasaki, Japan

[73] Assignee: Mitsubishi Denki Kabushiki Kaisha, Japan

[21] Appl. No.: 15,979

[22] Filed: Feb. 18, 1987

[30] Foreign Application Priority Data

Feb. 21, 1986 [JP] Japan .................................. 61-37748
Feb. 21, 1986 [JP] Japan .................................. 61-37749

[51] Int. Cl.⁴ ................................................ F02G 1/04
[52] U.S. Cl. ........................................ 60/517; 60/520
[58] Field of Search ................ 60/517, 525, 520; 62/6

[56] References Cited

U.S. PATENT DOCUMENTS 1,894,771 1/1933 Karasinski .
3,055,720 9/1962 Price ..................................... 309/51
4,620,418 11/1986 Fujiwara et al. ..................... 60/517

FOREIGN PATENT DOCUMENTS 830594 1/1952 Fed. Rep. of Germany .
1061235 4/1954 France .
1136251 5/1957 France .

Primary Examiner—Stephen F. Husar
Attorney, Agent, or Firm—Leydig, Voit & Mayer

[57] ABSTRACT

An apparatus for preventing lubricating oil from rising to the working spaces of a Stirling engine has a first and a second oil-absorbing member disposed within a cylindrical member in which a rod reciprocates. The first oil-absorbing member is secured to the rod with its outer periphery in sliding contact with the inner wall of the cylindrical member, and the second oil-absorbing member is secured to the cylindrical member with its inner periphery in sliding contact with the rod. A first baffle plate having a hole which is larger than the rod is secured to the cylindrical member immediately below and in intimate contact with the second oil-absorbing member. The first baffle plate makes the flow speed of gas through the second oil-absorbing member higher from above to below than from below to above. As a result, oil is continually blown downwards by a blast of accelerated gas and is returned to the crankcase of the engine.

4 Claims, 5 Drawing Figures

APPARATUS FOR PREVENTING THE RISE OF OIL IN A STIRLING ENGINE

BACKGROUND OF THE INVENTION

This invention relates to an apparatus for preventing lubricating oil for a Stirling engine from rising along the cylinder of the engine and reaching the working spaces thereof. More particularly but not exclusively, it relates to an apparatus for preventing the rise of oil in a displacer-type Stirling engine having a piston and a displacer coaxially disposed within the same cylinder.

In a Stirling engine, a portion of the lubricating oil for the crankshaft and the piston is formed into a fine mist by the reciprocating motion of the crosshead, piston rod, piston, displacer rod, and other moving parts of the engine. Despite the provision of seal rings on the piston and various seal devices between the piston and the displacer, the mist of lubricating oil is able to penetrate the working spaces of the engine, from where it enters the heat exchanger. As the presence of oil in the heat exchanger greatly reduces the efficiency of the engine, there is a need for an apparatus which can effectively prevent oil from rising to the working spaces of a Stirling engine.

SUMMARY OF THE INVENTION

It is an object of the present invention to provide an apparatus for preventing the rise of oil in a Stirling engine which can prevent oil from reaching the working spaces of the engine.

It is another object of the present invention to provide an apparatus for preventing the rise of oil in a Stirling engine which makes it unnecessary to provide a buffer space on the outside of the engine, thereby enabling the size and weight of the engine to be decreased.

It is another object of the present invention to provide an apparatus for preventing the rise of oil in a Stirling engine which can be utilized in a wide variety of Stirling engines.

In accordance with the present invention, an apparatus for preventing oil from rising to the working spaces of a Stirling engine has first and second annular oil-absorbing members which are coaxially disposed inside a cylindrical member of the engine in which a rod reciprocates. The first oil-absorbing member is secured to the rod by its inner periphery with its outer periphery in sliding contact with the inner wall of the cylindrical member, while the second oil-absorbing member is disposed above the first oil-absorbing member with its outer periphery secured to the inner wall of the cylindrical member and its inner periphery in sliding contact with the rod. The first and second oil-absorbing members are made of a material which is permeable to air. Means are provided for making the flow speed through the second oil-absorbing member higher from above to below than from below to above. In preferred embodiments, this means is an annular baffle which is secured to the cylindrical member in intimate contact with the lower surface of the second oil-absorbing member. The baffle is made of a material which is impermeable to air, but the inner diameter of the baffle is larger than the outer diameter of the rod so that gas can flow through the center of the baffle.

In a preferred embodiment of the present invention, the cylindrical member is a cylinder in which the piston and the displacer of the Stirling engine are both slidingly disposed, and the rod is a hollow piston rod which connects the piston with a crosshead. In another preferred embodiment, the cylindrical member is the hollow piston rod, and the rod on which the first oil-absorbing member is mounted is a displacer rod which passes through the center of the piston rod.

BRIEF DESCRIPTION OF THE DRAWINGS

In the drawings, the same reference numerals indicate the same or corresponding parts.

DESCRIPTION OF THE PREFERRED EMBODIMENTS

Figure 1:
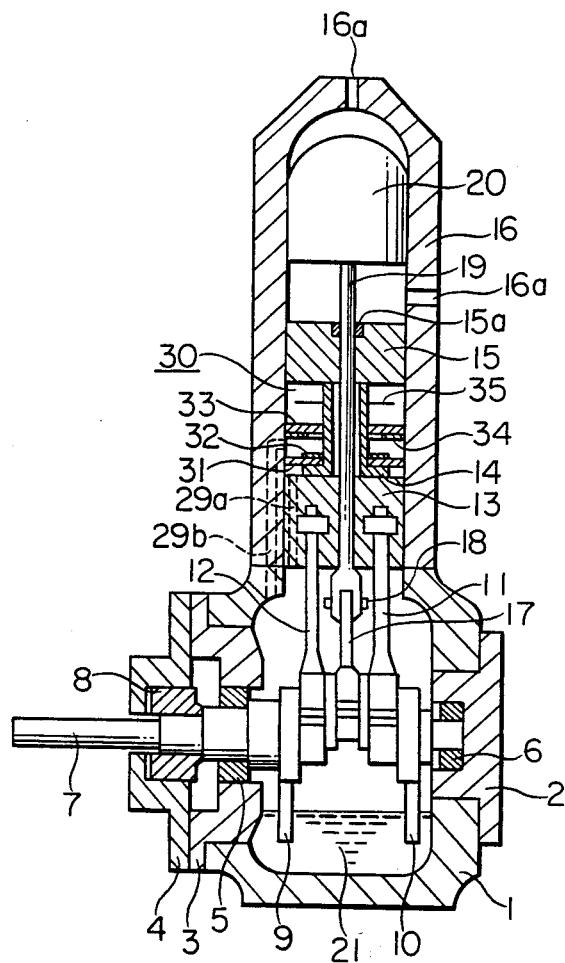
FIG. 1 is a vertical cross-sectional view of a first embodiment of the present invention which is used to prevent oil from rising along the cylinder of a single-cylinder Stirling engine.

Hereinbelow, a number of preferred embodiments of the present invention will be described while referring to the accompanying drawings, FIG. 1 of which is a vertical cross-sectional view of a single-cylinder Stirling engine to which a first embodiment of the present invention is applied. The Stirling engine of FIG. 1 has a crankcase 1 which serves as a base for the entire engine. The crankcase 1 has openings at its opposite ends which are covered by a first end plate 2 and a second end plate 4, the end plates being secured to the crankcase 1 by unillustrated fasteners such as bolts which pass through holes formed in the end plates. A bearing housing 3 is disposed between the second end plate 4 and the end surface of the crankcase 1 and is secured to the crankcase 1 by the same fasteners which secure the second end plate 4. A crankshaft 7 which extends longitudinally through the crankcase 1 is rotatably supported by two journal bearings 5 and 6 which are respectively secured to the bearing housing 3 and the first end plate 2. The outer end of the crankshaft 7 extends through a hole in the first end plate 4 and is connected to an unillustrated load. A mechanical seal 8 which surrounds the crankshaft 7 is secured to the inside of the second end plate 4. This mechanical seal prevents gas within the crankcase 1 from leaking to the outside of the engine. The crankshaft 7 has two counterweights 9 and 10 formed thereon which balance the crankshaft 7 during rotation. The bottom portion of the crankcase 1 serves as an oil sump and is filled with lubricating oil 21 which lubricates the crankshaft 7 and other moving parts.

The upper portion of the crankcase 1 has a circular hole formed therein which communicates with the inside of a cylinder 16 which is rigidly secured to the top of the crankcase 1 and extends vertically therefrom. A crosshead 13, a piston 15, and a dome-shaped displacer 20 are slidably and coaxially disposed within the cylinder 16. The crosshead 13 and the piston 15 are rigidly secured to one another by a hollow, longitudinallyextending piston rod 14 so as to reciprocate within the cylinder 16 as a single unit. Power is transmitted from the crosshead 13 to the crankshaft 7 by two piston connecting rods 11 and 12 which are connected at their upper ends to the crosshead 13 and are rotatably connected at their other ends to the crankshaft 7 by unillustrated bearings. Power is transmitted from the displacer 20 to the crankshaft 7 by a displacer rod 19 and a displacer connecting rod 17. The bottom end of the displacer connecting rod 17 is rotatably connected by unillustrated bearings to the crankshaft 7, while its upper end is pivotably linked to the lower end of the displacer rod 19 by a pin 18. The upper end of the displacer rod 19 is rigidly secured to the displacer 20. The displacer rod 19 passes through a hole formed in the center of the crosshead 13, through the hollow center of the piston rod 14. and through another hole formed in the center of the piston 15. Gas is prevented from passing along the length of the displacer rod 19 by a rod seal 15a which is secured inside a recess formed in the upper surface of the piston 15. Although not illustrated, the piston 15 and the displacer 20 have suitable seal rings mounted thereon for preventing gas from leaking along their outer peripheries.

The portion of the inside of the cylinder 16 above the displacer 20 serves as an expansion space, while the space between the bottom of the displacer 20 and the top of the piston 15 serves as a compression space. The expansion and the compression space are connected with one another by an unillustrated heat exchanger which is mounted on the outside of the cylinder 16. Holes 16a are formed in the top of the cylinder 16 above the expansion space and in the side of the cylinder 16 along the compression space. These holes 16a communicate with the inside of the heat exchanger. The combustion portion of the engine has been omitted from the drawing.

An apparatus for preventing the rise of oil in the illustrated Stirling engine is generally indicated by reference numeral 30 and comprises a first oil-absorbing member 31, a scattering-preventing plate 32, a second oil-absorbing member 33, a first baffle 34, and a second baffle 35. The first oil-absorbing member 31 is an annular member which surrounds the piston rod 14 and is secured atop the flange forming the bottom portion of the piston rod 14. The outer peripheral surface of the first oil-absorbing member 31 is in sliding contact with the inner wall of the cylinder 16. It should be partly or entirely made of a porous material which can absorb lubricating oil and is permeable to air. Some materials which are suitable for use as the first oil-absorbing member 31 are resin sponges, foamed metal, metallic mesh, or laminations thereof. It serves to absorb lubricating oil which adheres to the wall of the cylinder 16. As shown in FIG. 1, its bottom surface is separated from the top surface of the crosshead 13.

The scattering-preventing plate 32 is a rigid annulus having an outer diameter which is smaller than the inside diameter of the cylinder 16. It fits around the piston rod 14 and is secured atop the first oil-absorbing member 31. The scattering-preventing plate 32 stiffens the first oil-absorbing member 31 so that oil which is absorbed by the first oil-absorbing member 31 is not rescattered into the air within the cylinder 16 when the first oil-absorbing member 31 reciprocates together with the crosshead 13.

The second oil-absorbing member 33 is an annular member which surrounds the piston rod 14 and is disposed between the scattering-preventing plate 32 and the bottom surface of the Piston 15 with spaces left therebetween. It is secured to the inner wall of the cylinder 16 along its outer periphery, and the inner surface of the hole at its center is in sliding contact with the outer surface of the piston rod 14. It should be permeable to air and have the ability to absorb lubricating oil, and the same materials which were mentioned above for use as the first oil-absorbing member 31 are suitable for the second oil-absorbing member 33 as well. The second oil-absorbing member 33 absorbs lubricating oil adhering to the outer surface of the piston rod 14, and in addition acts as an air filter.

The first baffle 34 is an annular member which is disposed below the second oil-absorbing member 33 in intimate contact therewith. It can be secured to either the inner wall of the cylinder 16 or to the second oil-absorbing member 33. It is made of a material which is impermeable to air, but it has a hole at its center which has a larger diameter than the outer diameter of the piston rod 14 so that gas can pass therethrough. The first baffle 34 serves as a means for making the flow speed of gas which flows through the second oil-absorbing member 33 from above to below higher than the flow speed of gas flowing through it from below to above.

The second baffle 35 is an annular member whose outer diameter is smaller than the inner diameter of the cylinder 16. It surrounds and is rigidly secured to the piston rod 14 between the upper surface of the second oil-absorbing member 33 and the bottom surface of the piston 15 with spaces left therebetween in the axial direction of the piston rod 14. The second baffle 35 deflects lubricating oil which can not be absorbed by the oil-absorbing members 31 and 33 and prevents the oil from reaching the piston 15.

In a Stirling engine employing an apparatus for preventing the rise of oil according to the present invention, is possible to use the crankcase 1 of the engine as a buffer space, making the installation of a buffer space on the outside of the cylinder 16 unnecessary and allowing a decrease in the size and weight of the engine. In the illustrated Stirling engine, the space between the crosshead 13 and the piston 15 is connected with the inside of the crankcase 1 through a first connecting hole 29a which extends through the crosshead 13 from top to bottom, and a second connecting hole 29b which is formed in the side wall of the cylinder 16 and the top portion of the crankcase 1. Gas can pass through these connecting holes 29a and 29b from the inside of the cylinder 16 to the inside of the crankcase 1, enabling the crankcase 1 to be used as a buffer space. These connecting holes also serve as oil return holes through which lubricating oil can be returned from the inside of the cylinder 16 to the sump in the bottom of the crankcase 1. Furthermore, the connecting holes 29a and 29b decrease the amount of gas which flows through the second oil-absorbing member 33 as the crosshead 13 reciprocates, thereby helping to maintain the ability of the present invention to prevent the rise of oil. Although the illustrated engine employs two connecting holes, only one is necessary in order for the crankcase 1 to be used as a buffer space.

During the operation of the illustrated Stirling engine, the crosshead 13 and those portions of the inner wall of the cylinder 16 along which the crosshead 13 slides are lubricated by the lubricating oil 21. The first oil-absorbing member 31 absorbs oil adhering to the inner wall of the cylinder 16 and restrains the formation of a mist of oil 21 resulting from the reciprocation of the crosshead 13. Oil which is absorbed by the first oil-absorbing member 31 is prevented from being again scattered into the air by the scattering-preventing plate 32. Oil which adheres to the outer surface of the piston rod 14 is absorbed by the second oil-absorbing member 33 as the piston rod 14 slides up and down with respect to it.

When the crosshead 13 and the piston 15 rise, the space between the second oil-absorbing member 33 and the top surface of the crosshead 13 decreases in volume, and gas is caused to flow through the second oil-absorbing member 33 from below to above. As the gas flows through it, the oil contained in the gas is absorbed by the second oil-absorbing member 33. On the other hand, when the piston 15 descends, the downwards movement of the piston 15 causes gas to flow through the second oil-absorbing member 33 from above to below. Due to the provision of the first baffle 34, the gas accelerates as it passes downwards through the second oil-absorbing member 33, producing a blast of gas laden with oil directed downwards towards the first oil-absorbing member 31. Oil which adhers to the piston rod 14 and can not be absorbed by the second oil-absorbing member 33 is prevented from reaching the piston 15 by the second baffle 35. When a certain amount of oil 21 accumulates in the first oil-absorbing member 31, it flows downwards and is returned to the sump in the bottom of the crankcase 1 through the connecting holes 29a and 29b. Thus, lubricating oil 21 from the crankcase 1 which enters the cylinder 15 can be effectively prevented from reaching the working spaces of the engine, and as a result, the efficiency and reliability of the engine are increased.

Figure 2:
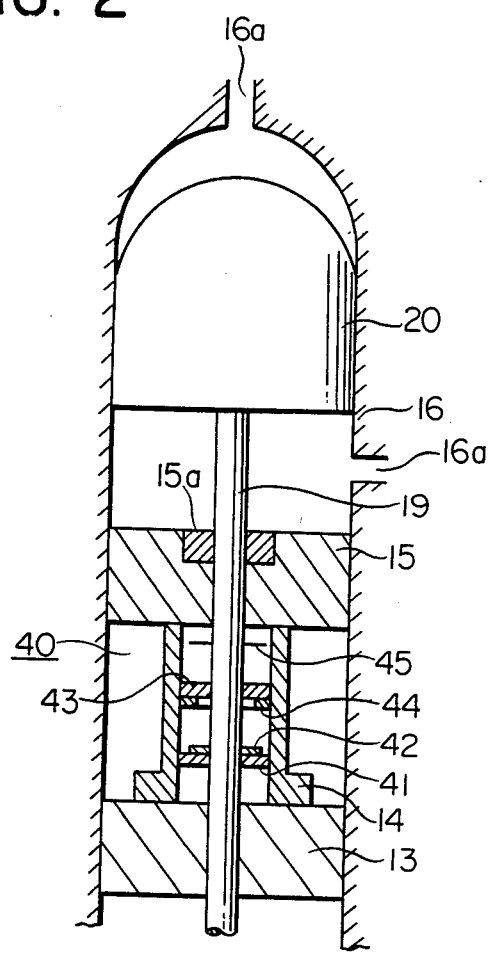
FIG. 2 is a vertical cross-sectional view of a second embodiment of the present invention which is used to prevent oil from rising along the displacer rod of a single-cylinder Stirling engine.

FIG. 2 is a longitudinal cross-sectional view of the upper portion of a single-cylinder Stirling engine identical to the one illustrated in FIG. 1 to which a second embodiment of the present invention is applied. This second embodiment, generally indicated by reference numeral 40, is used to prevent oil from rising along the displacer rod 19 of the engine. In this embodiment, an annular first oil-absorbing member 41 is rigidly secured to the displacer rod 19 with its outer periphery in sliding contact with the inner wall of the piston rod 14. The first oil-absorbing member 41 is made of an air-permeable material similar to that used for the oil-absorbing members in the first embodiment. A rigid scattering-preventing plate 42, corresponding to the scattering-preventing plate 32 of FIG. 1, is mounted atop and in contact with the first oil-absorbing member 41, secured either thereto or to the displacer rod 19. Its outer diameter is smaller than the inner diameter of the piston rod 14. An annular second oil-absorbing member 43, corresponding to the second oil-absorbing member 33, is secured to the inner wall of the piston rod 14 along its outer periphery between the scattering-preventing plate 42 and the bottom of the piston 15 with spaces left therebetween. The inner surface of the hole at its center is in sliding contact with the outer surface of the piston rod 19. Like the second oil-absorbing member 33 of the first embodiment, it is made of a material which is permeable to air and which can absorb lubricating oil. An annular first baffle 44 having a hole at its center which is larger in diameter than the displacer rod 19 is secured to the inner wall of the piston rod 14 immediately below and in intimate contact with the second oil-absorbing member 43. The first baffle 44 serves as a means for making the flow speed of gas through the second oil-absorbing member 43 greater from above to below than from below to above. An annular second baffle 45 whose outer diameter is smaller than the inner diameter of the piston rod 14 is secured to the displacer rod 19 between the second oil-absorbing member 43 and the bottom surface of the piston 15 with spaces left therebetween. The unillustrated portions of this engine are identical to those of the Stirling engine illustrated in FIG. 1.

During the operation of this engine, lubricating oil from the crankcase adheres to the displacer rod 19 and is carried by the displacer rod 19 into the space within the piston rod 14. The reciprocating movement of the displacer rod 19 scatters the oil inside the piston rod 14. That portion of the oil which adheres to the inner wall of the piston rod 14 is absorbed by the first oil-absorbing member 41, and the oil which is absorbed thereby is prevented from being rescattered by the scattering-preventing plate 42. Oil which adheres to the displacer rod 19 is absorbed by the second oil-absorbing member 43. When gas passes through the second oil-absorbing member 43 from below to above, oil contained in the gas is absorbed by the second oil-absorbing member 43, which acts as an air filter. On the other hand, when gas flows through it from above to below, the presence of the first baffle 44 causes the gas to be accelerated, and oil which was absorbed by the second oil-absorbing member 43 is discharged downwards towards the first oil-absorbing member 41 in a burst of gas. Oil which can not be absorbed by the second oil-absorbing member 43 is deflected by the second baffle 45 which is mounted on the displacer rod 19 and is prevented from reaching the piston 15.

Thus, in a manner similar to the first embodiment, this embodiment of the present invention prevents oil from entering the working spaces of the Stirling engine, resulting in increased efficiency and reliability.

It is possible to simultaneously apply the embodiments of FIG. 1 and FIG. 2 to a single Stirling engine so as to prevent oil from rising along the wall of the cylinder of a Stirling engine in the manner shown in FIG. 1, and at the same time to prevent oil from rising along the displacer rod in the manner shown in FIG. 2.

Figure 3:
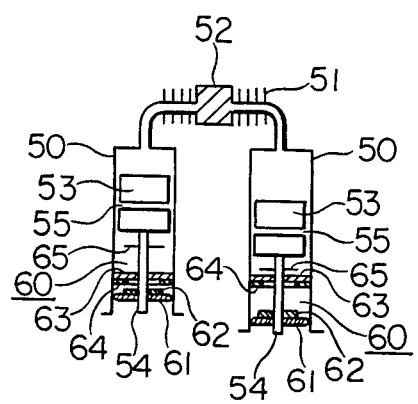
FIG. 3 is a schematic view of a third embodiment of the present invention applied to a two-cylinder Stirling engine.

The previous two embodiments of the present invention were applied to a displacer-type Stirling engine having a hollow piston rod, but the present invention is applicable to other types of Stirling engines as well. FIG. 3 illustrates a third embodiment of the present invention applied to a two-cylinder Stirling engine. This engine comprises two cylinders 50 whose upper portions communicate with one another via a heat exchanger 51 and a regenerator 52. A piston 53 connected to a piston rod 54 is slidably disposed inside each cylinder 50. The lower end of each piston rod 54 is connected to an unillustrated crosshead. Each piston 53 has one or more piston rings 55 mounted thereon. In each cylinder 50 is provided an apparatus for preventing the rise of lubricating oil along the inside of the cylinder 50. generally indicated by reference numeral 60 and comprising elements numbers 61 through 65. An annular first oil-absorbing member 61 which is permeable to air is rigidly secured to the piston rod 54 so as to reciprocate therewith, the outer periphery thereof being in sliding contact with the inner wall of the cylinder 50. A scattering-preventing plate 62 is mounted on the piston rod 54 in intimate contact with the first oil-absorbing member 61. An annular second oil-absorbing member 63 which is permeable to air is secured to the inner wall of the cylinder 50 along its outer periphery between the scattering-preventing plate 62 and the bottom surface of the piston 53 with spaces left therebetween. The sides of the hole at the center of the second oil-absorbing member 63 are in sliding contact with the piston rod 54. An annular first baffle 64 having a hole at its center which has a larger diameter than the piston rod 54 is secured to the cylinder 50 along its outer periphery in intimate contact with the second oil-absorbing member 63, the first baffle 64 serving as a means for making the flow speed of gas through the second oil-absorbing member 63 higher from above to below than from below to above. An annular second baffle 65 is secured to the piston rod 54 between the second oil-absorbing member 63 and the bottom surface of the piston 53 with spaces left therebetween. The oil-absorbing members are made of the same type of materials as are the oil-absorbing members in the previous embodiments.

The operation of this embodiment is basically the same as that of the previous two embodiments. The first oil-absorbing member 61 absorbs lubricating oil adhering to the inner wall of the cylinder 50 and oil which is scattered upwards by the unillustrated crosshead, and the scattering-preventing plate 62 prevents the absorbed oil from being rescattered by the reciprocating motion of the first oil-absorbing member 61. The second oil-absorbing member 63 absorbs oil adhering to the piston rod 54. When the piston 53 moves up and down, gas is caused to flow through the second oil-absorbing member 63. When the gas passes through it from below to above, oil contained in the gas is absorbed by the second oil-absorbing member 63, and when gas flows through it in the opposite direction, the first baffle 64 forces the gas to accelerate, producing a downwards blast of gas which ejects oil from the second oil-absorbing member 63 towards the first oil-absorbing member 61. Thus, in the same manner as in the previous embodiments, lubricating oil for the Stirling engine is prevented from reaching the piston 53 and the working spaces of the engine.

Figure 4:
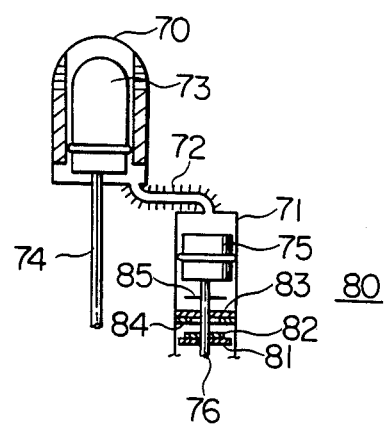
FIG. 4 is a schematic view of a fourth embodiment of the present invention applied to a gamma-type Stirling engine.

FIG. 4 is a schematic view of a fourth embodiment of the present invention which is applied to a gamma-type Stirling engine. This engine has a first cylinder 70 whose lower portion is connected to the top portion of a second cylinder 71 via a heat exchanger 72. A displacer 73 which is secured to a displacer rod 74 is slidably disposed inside the first cylinder 70. A piston 75 is slidably disposed within the second cylinder 71, the piston 75 being secured to a piston rod 76 which in turn is secured to an unillustrated crosshead. An apparatus for preventing the rise of lubricating oil to the piston 75 is generally indicated by reference numeral 80 and comprises elements numbers 81 through 85. An annular first oil-absorbing member 81 which is permeable to air is rigidly secured to the piston rod 76 so as to reciprocate therewith, the outer periphery thereof being in sliding contact with the inner wall of the second cylinder 71. A scattering-preventing plate 82 is mounted on the piston rod 76 in intimate contact with the first oil-absorbing member 81. An annular second oil-absorbing member 83 which is permeable to air is secured to the inner wall of the second cylinder 71 along its outer periphery between the scattering-preventing plate 82 and the bottom surface of the piston 75 with spaces left therebetween. The sides of the hole at the center of the second oil-absorbing member 83 are in sliding contact with the piston rod 76. An annular first baffle 84 having a hole at its center which has a larger diameter than the piston rod 76 is secured to the walls of the second cylinder 71 along its outer periphery in intimate contact with the second oil-absorbing member 83, the first baffle 84 serving as a means for making the flow speed of gas through the second oil-absorbing member 83 higher from above to below than from below to above. An annular second baffle 85 is secured to the piston rod 76 between the second oil-absorbing member 83 and the bottom surface of the piston 75 with spaces left therebetween. The oil-absorbing members are made of the same type of materials as are the oil-absorbing members in the previous embodiments. The operation of this embodiment is the same as that of the previous embodiments.

Figure 5:
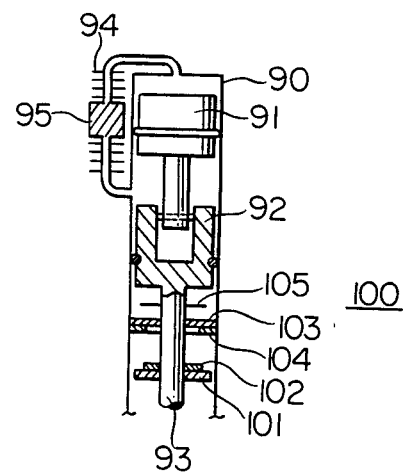
FIG. 5 is a schematic view of a fifth embodiment of the present invention applied to a free-piston Stirling engine.

FIG. 5 illustrates a fifth embodiment of the present invention which is applied to a free-piston Stirling engine. A displacer 91 and a piston 92 are slidably disposed within a single cylinder 90. The piston 92 is secured to a piston rod 93, which in turn is secured to an unillustrated crosshead so as to reciprocate therewith. The space within the cylinder 90 above the displacer 91 is connected with the space between the lower surface of the displacer 91 and the upper surface of the piston 92 by a heat exchanger 94 and a regenerator 95. An apparatus for preventing the rise of lubricating oil along the inside of the cylinder 90 to the piston 92, generally indicated by reference numeral 100, comprises elements numbers 101 through 105. An annular first oil-absorbing member 101 which is permeable to air is rigidly secured to the piston rod 93 so as to reciprocate therewith, the outer periphery thereof being in sliding contact with the inner wall of the cylinder 90. A scattering-preventing plate 102 is mounted on the piston rod 93 in intimate contact with the first oil-absorbing member 101. An annular second oil-absorbing member 103 which is permeable to air is secured to the inner wall of the cylinder 90 along its outer periphery between the scattering-preventing plate 102 and the bottom surface of the piston 92 with spaces left therebetween. The sides of the hole at the center of the second oil-absorbing member 103 are in sliding contact with the piston rod 93. An annular first baffle 104 having a hole at its center which has a larger diameter than the piston rod 93 is secured to the walls of the cylinder 90 along its outer periphery in intimate contact with the second oil-absorbing member 103, the first baffle 104 serving as a means for making the flow speed of gas through the second oil-absorbing member 103 higher from above to below than from below to above. An annular second baffle 105 is secured to the piston rod 93 between the second oil-absorbing member 103 and the bottom surface of the piston 92 with spaces left therebetween. The oil-absorbing members are made of the same type of materials as are the oil-absorbing members in the previous embodiments. The operation of this embodiment is the same as that of the previous embodiments.

What is claimed is:

1. An apparatus for preventing lubricating oil from rising to the working spaces of a Stirling engine, the Stirling engine having a rod which reciprocates inside a cylindrical member, comprising:

a first oil-absorbing member which has an annular shape and which is secured to said rod so as to reciprocate therewith, the outer periphery of said first oil-absorbing member being in sliding contact with the inner surface of said cylindrical member;

an oil scattering-preventing plate which has an annular shape and which is mounted on said rod above said first oil-absorbing member in intimate contact with said first oil-absorbing member, the outer diameter of said scattering-preventing plate being smaller than the inner diameter of said cylindrical member;

a second oil-absorbing member which has an annular shape, which is permeable to air, and which is secured along its outer periphery to the inner surface of said cylindrical member above and separated from said oil scattering-preventing plate, the inner periphery of said second oil-absorbing member being in sliding contact with the outer surface of said rod;

means for making the flow speed of gas which through said second oil-absorbing member during the operation of said Stirling engine higher from above to below said second oil-absorbing member than from below to above said second oil-absorbing member; and an annular baffle which is secured to said rod above and separated from said second oil-absorbing member, the outer diameter of said annular baffle being smaller than the inner diameter of said cylindrical member.

2. An apparatus as claimed in claim 1, wherein said means is a annular member which is made of a material which is impermeable to air and which is mounted on said cylindrical member immediately below and in intimate contact with the lower surface of said second oil-absorbing member, its outer diameter being substantially the same as the inner diameter of said cylindrical member and its inner diameter being larger than the outer diameter of said rod.

3. An apparatus as claimed in claim 2, wherein said rod is a piston rod which is connected to a reciprocating piston of said engine, and said cylindrical member is a cylinder in which said piston is slidingly disposed.

4. An apparatus as claimed in claim 2, wherein said engine has a crosshead, a piston, and a displacer which are slidingly disposed within a cylinder, said rod is a displacer rod which passes through said crosshead and said piston and connects to said displacer, and said cylindrical member is a hollow piston rod which connects said crosshead to said piston and which surrounds said displacer rod.

* * * * *